United States Patent [19]

Ward

[11] Patent Number: 5,586,403
[45] Date of Patent: Dec. 24, 1996

[54] ILLUMINATED FISHING ROD

[76] Inventor: Maurice Ward, RR #6, Orillia, Ontario, Canada, L3V 6H6

[21] Appl. No.: 552,717

[22] Filed: Nov. 3, 1995

[51] Int. Cl.⁶ .................................................. A01K 75/02
[52] U.S. Cl. ............................................ 43/17.5; 43/18.1
[58] Field of Search ...................... 43/17.5, 18.1

[56] References Cited

U.S. PATENT DOCUMENTS

| | | | |
|---|---|---|---|
| 1,836,034 | 12/1931 | Luchansky | 43/18.1 |
| 2,646,640 | 7/1953 | George | 43/17.5 |
| 3,017,499 | 1/1962 | Fore | 43/17.5 |
| 4,048,743 | 9/1977 | Lapinski | 43/18.1 |
| 4,479,321 | 10/1984 | Welstead | 43/17.5 |
| 4,750,287 | 6/1988 | Myers | 43/17.5 |
| 4,780,980 | 11/1988 | McCullough | 43/17.5 |
| 5,083,247 | 1/1992 | Robinson et al. | 43/17.5 |
| 5,179,797 | 1/1993 | Edwards et al. | 43/17.5 |
| 5,406,735 | 4/1995 | Howell | 43/17.5 |

*Primary Examiner*—Joseph J. Hail, III
*Assistant Examiner*—Darren Ark

[57] ABSTRACT

An illuminated fishing rod comprised of an elongated fishing rod having a plurality of eyelets arranged in a linear relationship along a length thereof. A flashlight portion is received within an open lower end of the elongated fishing rod. A light portion is electrically coupled with an upper end portion of the elongated fishing rod.

3 Claims, 3 Drawing Sheets

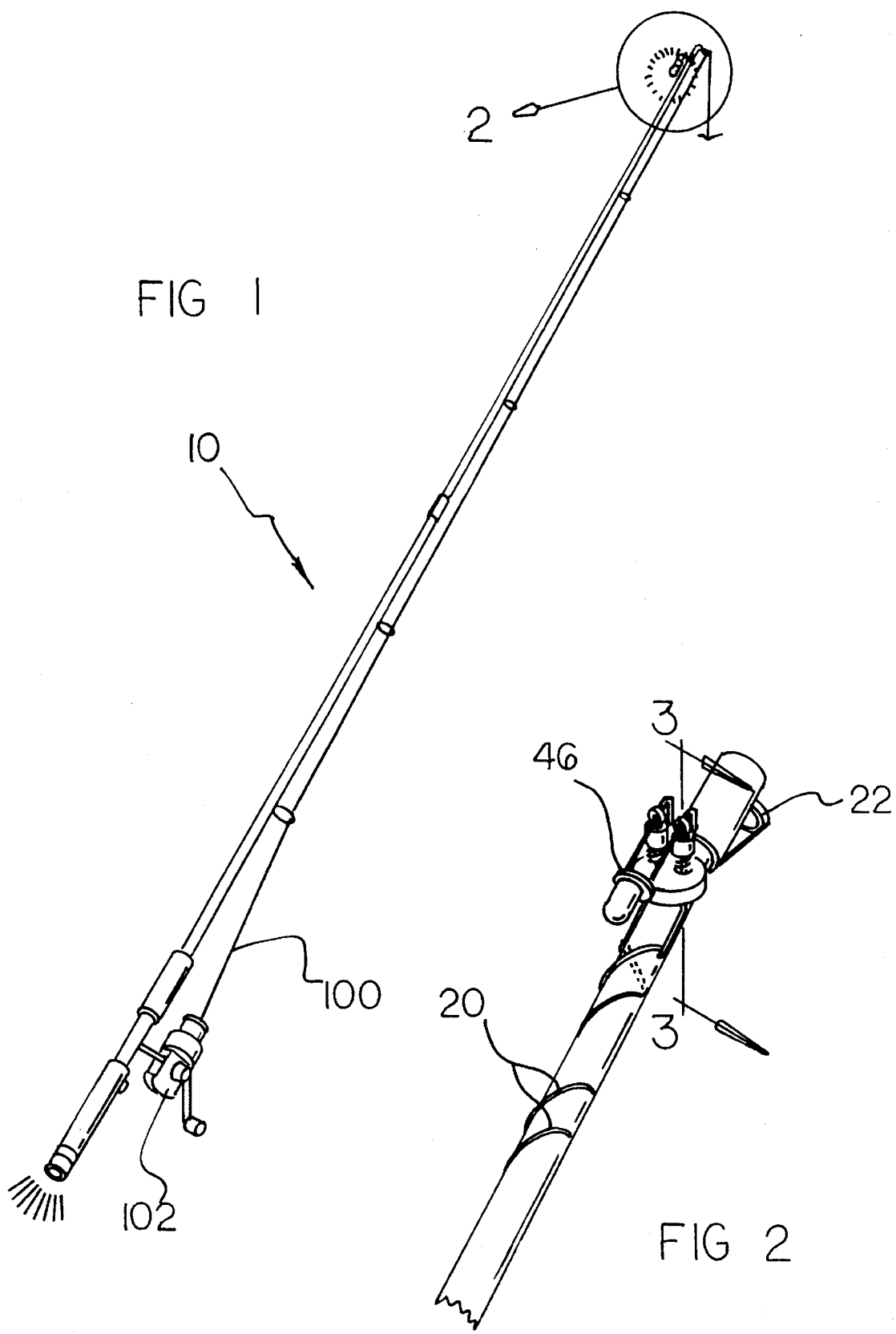

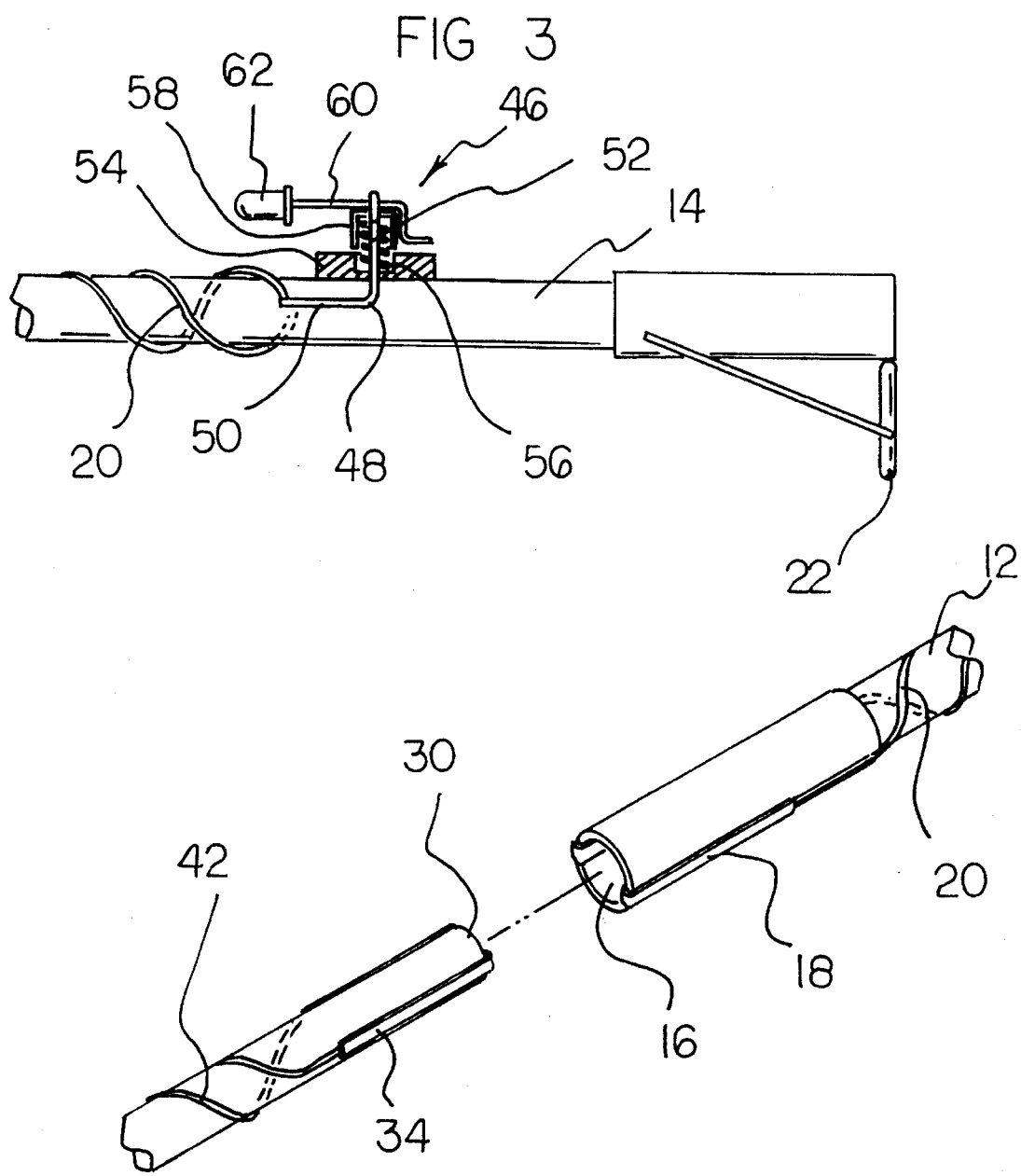

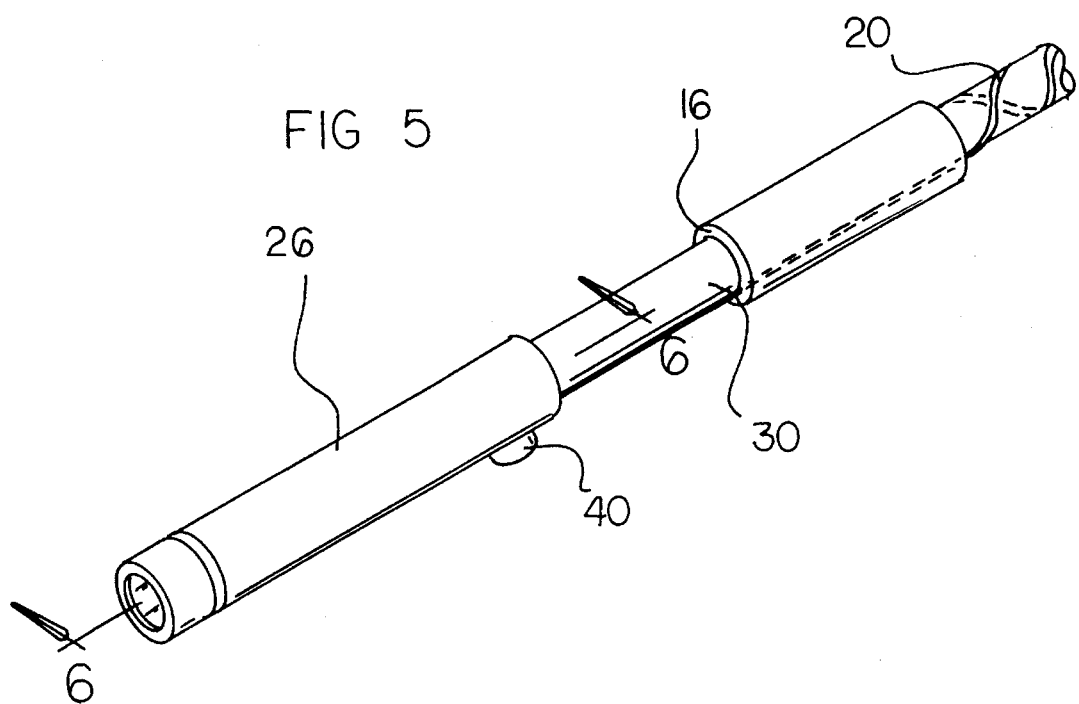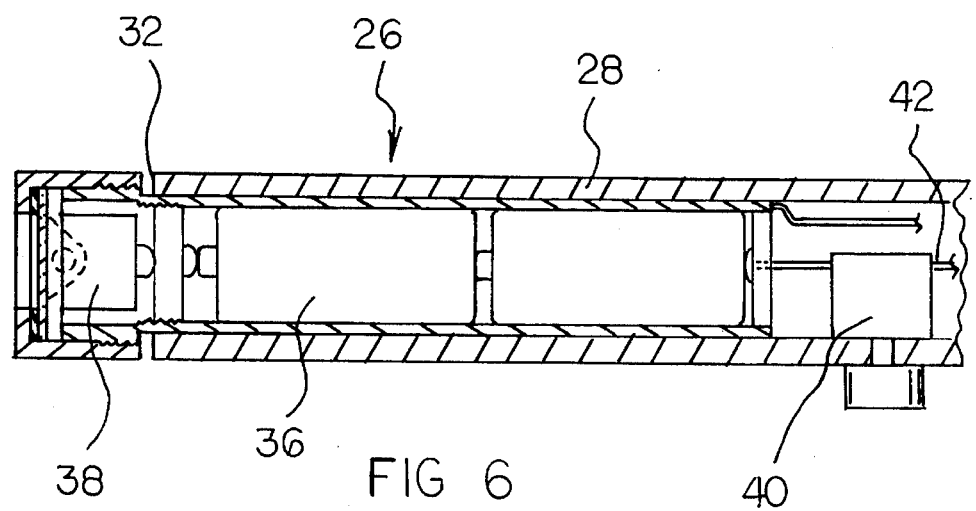

5,586,403

ILLUMINATED FISHING ROD

BACKGROUND OF THE INVENTION

1. Field of the Invention

The present invention relates to an illuminated fishing rod and more particularly pertains to providing multiple lights for a variety of illumination purposes with an illuminated fishing rod.

2. Description of the Prior Art

The use of fishing poles with lights is known in the prior art. More specifically, fishing poles with lights heretofore devised and utilized for the purpose of illuminating a fishing pole are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,274,943 to Ratcliffe et al. discloses an indicating device for fishing rods.

U.S. Pat. No. 4,117,618 to Utsler discloses a fishing pole with spaced illuminating means.

U.S. Pat. No. Des. 346,007 to Barkley, Jr. discloses the ornamental design for an illuminating handle for fishing rod.

U.S. Pat. No. 5,083,249 to Chen discloses a light marker for fishing rod.

U.S. Pat. No. 4,697,375 to Mills discloses a fishing pole tip position signalling light assembly.

U.S. Pat. No. 5,205,061 to Echols, Jr. discloses a movement indicator for fishing rod.

While these devices fulfill their respective, particular objective and requirements, the aforementioned patents do not describe an illuminated fishing rod for providing multiple lights for a variety of illumination purposes.

In this respect, the illuminated fishing rod according to the present invention substantially departs from the conventional concepts and designs of the prior art, and in doing so provides an apparatus primarily developed for the purpose of providing multiple lights for a variety of illumination purposes.

Therefore, it can be appreciated that there exists a continuing need for new and improved illuminated fishing rod which can be used for providing multiple lights for a variety of illumination purposes. In this regard, the present invention substantially fulfills this need.

SUMMARY OF THE INVENTION

In the view of the foregoing disadvantages inherent in the known types of fishing poles with lights now present in the prior art, the present invention provides an improved illuminated fishing rod. As such, the general purpose of the present invention, which will be described subsequently in greater detail, is to provide a new and improved illuminated fishing rod and method which has all the advantages of the prior art and none of the disadvantages.

To attain this, the present invention essentially comprises an elongated fishing rod having an upper end portion and an open lower end. The open lower end has a pair of copper contacts therein. The fishing rod has copper wire extending from the copper contacts at the open lower end thereof to the upper end portion. The fishing rod has a plurality of eyelets arranged in a linear relationship along a length thereof. The device includes a flashlight portion comprised of a lower housing having an upper end portion and an open lower end. The upper end portion has a pair of copper contacts therein. The upper end portion is dimensioned to be received within the open lower end of the elongated fishing rod with copper contacts thereof in cooperation. The lower housing has a pair of batteries therein. The open lower end has a lamp portion removably coupled thereto. The lamp portion contacts a lowermost of the pair of batteries for activation thereof. The lower housing has an on/off switch electrically coupled with the pair of batteries for activation or deactivation of the lamp portion. The on/off switch has copper wiring extending therefrom to couple with the pair of copper contacts of the upper end portion. The device includes a light portion comprised of a pair of L-shaped contacts secured to the upper end portion of the elongated fishing rod. The pair of L-shaped contacts each have a lower end electrically coupled with end portions of the copper wire. The pair of L-shaped contacts each have an upper portion extending upwardly through a base portion from the fishing rod. Each upper portion has a spring coupled therewith. Each upper portion has a spring housing secured around an upper end thereof. Each upper portion has an elongated metal stem extending therethrough. Each metal stem has a light on an end portion thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated fishing rod which has all the advantages of the prior art fishing poles with lights and none of the disadvantages.

It is another object of the present invention to provide a new and improved illuminated fishing rod which may be easily and efficiently manufactured and marketed.

It is a further object of the present invention to provide a new and improved illuminated fishing rod which is of durable and reliable construction.

An even further object of the present invention its to provide a new and improved illuminated fishing rod which is susceptible of a low cost of manufacture with regard to both materials and labor, and which accordingly is then susceptible of low prices of sale to the consuming public, thereby making such an illuminated fishing rod economically available to the buying public.

Still yet another object of the present invention is to provide a new and improved illuminated fishing rod which provides in the apparatuses and methods of the prior art some of the advantages thereof, while simultaneously overcoming some of the disadvantages normally associated therewith.

Even still another object of the present invention is to provide a new and improved illuminated fishing rod for providing multiple lights for a variety of illumination purposes.

Lastly, it is an object of the present invention to provide a new and improved illuminated fishing rod comprised of an elongated fishing rod having a plurality of eyelets arranged in a linear relationship along a length thereof. A flashlight portion is received within an open lower end of the elongated fishing rod. A light portion is electrically coupled with an upper end portion of the elongated fishing rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the illuminated fishing rod constructed in accordance with the principles of the present invention.

FIG. 2 is a perspective view of the upper end of the fishing rod of the present invention.

FIG. 3 is a cross-sectional view as taken along line 3—3 of FIG. 2.

FIG. 4 is a perspective view of the lower housing coupled with the upper end of the fishing rod. FIG. 5 is a perspective view of the lower housing of the present invention.

FIG. 6 is a cross-sectional view as taken long line 6—6 of FIG. 5.

The same reference numerals refer to the same parts through the various Figures.

DESCRIPTION OF THE PREFERRED EMBODIMENT

With reference now to the drawings, and in particular, to FIGS. 1–6 thereof, the preferred embodiment of the new and improved illuminated fishing rod embodying the principles and concepts of the present invention and generally designated by the reference number 10 will be described.

Specifically, it will be noted in the various Figures that the device relates to a new and improved illuminated fishing rod for providing multiple lights for a variety of illumination purposes. In its broadest context, the device consists of an elongated fishing rod, a flashlight portion, and a light portion. Such components are individually configured and correlated with respect to each other so as to attain the desired objective.

The device 10 includes an elongated fishing rod 12 having an upper end portion 14 and an open lower end 16. The open lower end 16 has a pair of copper contacts 18 therein. The fishing rod 12 has copper wire 20 extending from the copper contacts 18 at the open lower end 16 thereof to the upper end portion 14. The fishing cod 12 has a plurality of eyelets 22 arranged in a linear relationship along a length thereof. The eyelets 22 allow for fishing line 100 to be threaded therethrough. The copper wire 20 wraps around the fishing rod 12 to extend from the lower end 16 to the upper end portion 14. The copper wire 20 terminates at a position before reaching the tip of the fishing rod 12. The fishing rod 12 would include a reel 102 secured to a lower portion thereof for extraction of the fishing line 100.

The device 10 includes a flashlight portion 26 comprised of a lower housing 28 having an upper end portion 30 and an open lower end 32. The upper end portion 30 has a pair of copper contacts 34 therein. The upper end portion 30 is dimensioned to be received within the open lower end 16 of the elongated fishing rod 12 with copper contacts 34,18 thereof in cooperation. The lower housing 28 has a pair of batteries 36 therein. The open lower end 32 has a lamp portion 38 removably coupled thereto. The lamp portion 38 contacts a lowermost of the pair of batteries 36 for activation thereof. The lamp portion 38 can be easily unscrewed from the open lower end 32 to facilitate the removal of the pair of batteries 36 once they have expired. The lower housing 28 has an on/off switch 40 electrically coupled with the pair of batteries 36 for activation or deactivation of the lamp portion 38. The on/off switch 40 has copper wiring 42 extending therefrom to couple with the pair of copper contacts 34 of the upper end portion 30.

The device 10 includes a light portion 46 comprised of a pair of L-shaped contacts 48 secured to the upper end portion 14 of the elongated fishing rod 12. The pair of L-shaped contacts 48 each have a lower end 50 electrically coupled with end portions of the copper wire 20. The pair of L-shaped contacts 48 each have an upper portion 52 extending upwardly through a base portion 54 from the fishing rod 12. Each upper portion 52 has a spring 56 coupled therewith. Each upper portion 52 has a spring housing 58 secured around an upper end thereof. Each upper portion 52 has an elongated metal stem 60 extending therethrough. Each metal stem 60 has a light 62 on an end portion thereof. Once the on/off switch 40 has activated the lamp portion 38, the light 62 will also be activated to illuminate the upper end portion 14 of the fishing rod 12.

As to the manner or usage and operation of the present invention, the same should be apparent from the above description. Accordingly, no further discussion relating to the manner of usage ann operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An illuminated fishing rod for providing multiple lights for a variety of illumination purposes comprising, in combination:

an elongated fishing rod having an upper end portion and an open lower end, the open lower end having a pair of copper contacts therein, the fishing rod having copper wire extending from the copper contacts at the open lower end thereof to the upper end portion, the fishing rod having a plurality of eyelets arranged in a linear relationship along a length thereof;

a flashlight portion comprised of a lower housing having an upper end portion and an open lower end, the upper end portion having a pair of copper contacts therein, the upper end portion dimensioned to be received within the open lower end of the elongated fishing rod with copper contacts thereof in cooperation, the lower housing having a pair of batteries therein, the open lower end having a lamp portion removably coupled thereto, the lamp portion contacting a lowermost of the pair of batteries for activation thereof, the lower housing having an on/off switch electrically coupled with the pair of batteries for activation or deactivation of the lamp portion, the on/off switch having copper wiring extending therefrom to couple with the pair of copper contacts of the upper end portion; and a light portion comprised of a pair of L-shaped contacts secured to the upper end portion of the elongated fishing rod, the pair of L-shaped contacts each having a lower end electrically coupled with end portions of the copper wire, the pair of L-shaped contacts each having an upper portion extending upwardly through a base portion from the fishing rod, each upper portion having a spring coupled therewith, each upper portion having a spring housing secured around an upper end thereof, each upper portion having an elongated metal stem extending therethrough, the metal stems having a light on an end portion thereof.

2. An illuminated fishing rod comprising:

an elongated fishing rod having a plurality of eyelets arranged in a linear relationship along a length thereof, the open lower end of the elongated fishing rod having a pair of copper contacts therein, the fishing rod having copper wire extending from the copper contacts at the open lower end thereof to the upper end portion for electrical coupling with the light portion, the copper wire being wrapped around the fishing pole;

a flashlight portion received within an open lower end of the elongated fishing rod, the flashlight portion comprises of a lower housing having an upper and portion and an open lower end, the upper end portion having a pair of copper contacts therein, the upper end portion dimensioned to be received within the open lower end of the elongated fishing rod with copper contacts thereof in cooperation with contacts within the fishing rod, the lower housing having a pair of batteries therein, the open lower end having a lamp portion removably coupled thereto to facilitate the removal of batteries, the lamp portion contacting a lowermost of the pair of batteries for activation thereof, the lower housing having an on/off switch electrically coupled with the pair of batteries for activation or deactivation of the lamp portion, the on/off switch having copper wiring extending therefrom to couple with the pair of copper contacts of the upper end portion; and a light portion electrically coupled to an upper end portion of the elongated fishing rod.

3. An illuminated fishing rod comprising:

an elongated fishing rod having a plurality of eyelets arranged in a linear relationship along a length thereof;

a flashlight portion received within an open lower end of the elongated fishing rod; and a light portion electrically coupled to an upper end portion of the elongated fishing rod, the light portion comprising of a pair of L-shaped contacts secured to the upper end portion of the elongated fishing rod, the pair of L-shaped contacts each having a lower end electrically coupled with end portions of copper wire around the fishing rod, the pair of L-shaped contacts each having an upper portion extending upwardly through a base portion from the fishing rod, each upper portion having a spring coupled therewith, each upper portion having a spring housing secured around an upper end thereof, each upper portion having an elongated metal stem extending therethrough, the metal stems having a light on an end portion thereof.

\* \* \* \* \*